Feb. 9, 1943.   P. J. SCHWARZHAUPT ET AL   2,310,261
PRESSURE RESPONSIVE DEVICE
Filed Feb. 1, 1941
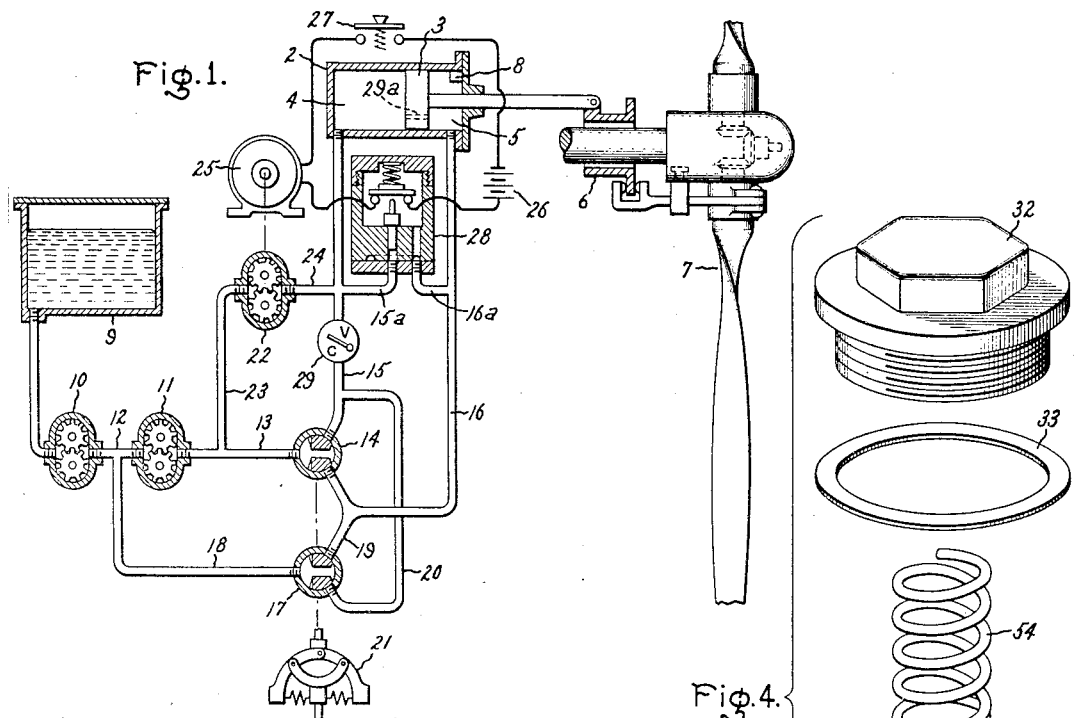
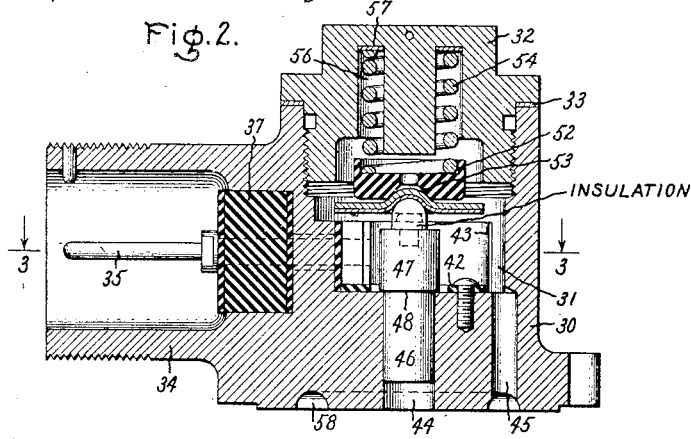
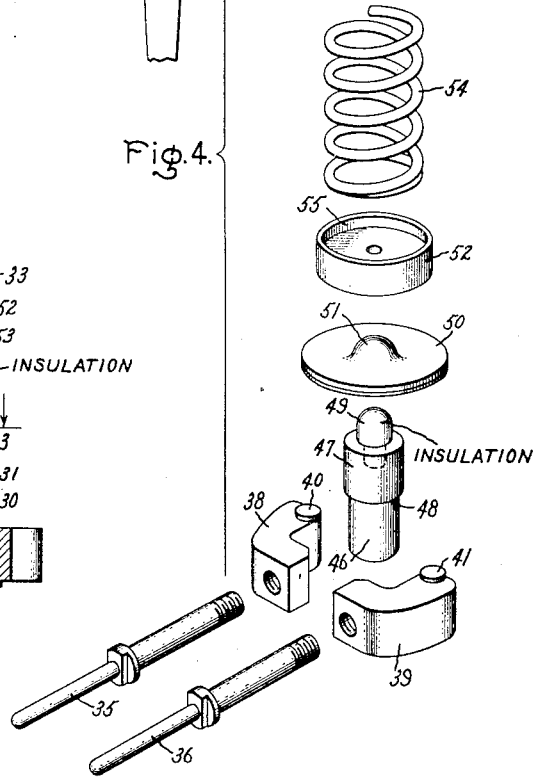
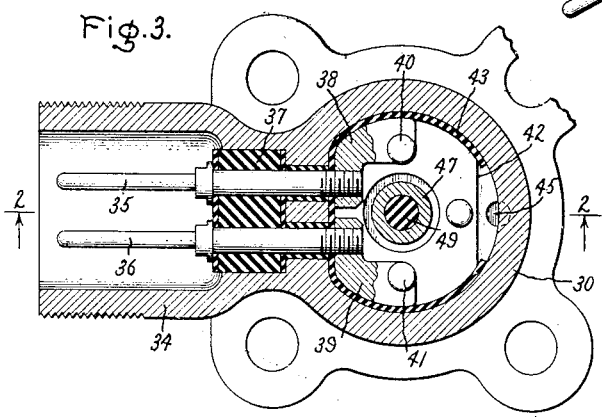
Inventors:
Paul J. Schwarzhaupt,
Kenneth A. Killam,
Laurens A. Taylor,
by Harry E. Dunham
Their Attorney.

Patented Feb. 9, 1943

2,310,261

UNITED STATES PATENT OFFICE 2,310,261

PRESSURE RESPONSIVE DEVICE

Paul J. Schwarzhaupt, Scotia, and Kenneth A. Killam and Laurens A. Taylor, Schenectady, N. Y., assignors to General Electric Company, a corporation of New York Application February 1, 1941, Serial No. 377,034

6 Claims. (Cl. 200—82)

The present invention relates to pressure responsive devices, more particularly to differential pressure responsive cutout switches such as may be used in arrangements for feathering aircraft propellers, although it is not limited thereto necessarily. Certain aircraft propeller arrangements include means for adjusting the propeller pitch, that is, the angle between the propeller blade surface and the plane of rotation. Under certain operating conditions, also in case of engine trouble, it is desirable rapidly to feather the propeller, that is, to turn the propeller blades into neutral position in which said angle is about 90°.

One object of our invention is to provide an improved construction and arrangement of pressure responsive devices, and another object of our invention is to provide an improved differential pressure responsive cutout switch.

For a consideration of what we believe to be novel and our invention, attention is directed to the following description and the claims appended thereto in connection with the accompanying drawing.

In the drawing, Fig. 1 illustrates an aircraft propeller feathering arrangement embodying our invention; Fig. 2 illustrates a sectional detail view of a differential pressure responsive cutout switch used in the arrangement of Fig. 1; Fig. 3 is a section along line 3—3 of Fig. 2, Fig. 2 being a section along line 2—2 of Fig. 3; and Fig. 4 is an exploded perspective view of a part of Fig. 2.

Fig. 1 shows diagrammatically an arrangement for varying the pitch and for feathering of an aircraft propeller. The arrangement comprises a servo motor 2 having a cylinder with a piston 3 movably disposed in the cylinder and defining therewith fluid pressure chambers 4 and 5. The piston 3 has a stem connected to a sleeve 6 for adjusting the pitch of the blades of a propeller 7. During operation, movement of the piston 3 towards the left increases the pitch, and movement of the piston towards the right decreases the pitch. In the right-hand end position the piston engages a stop 8 and in this position the propeller is feathered, that is, the angle between the propeller blade plane and the plane of rotation is about 90°.

The hydraulic system for operating the servo motor 2 to vary the propeller pitch and to feather the propeller blades comprises a source 9 of operating fluid, such as oil, and means for forcing the operating fluid from the source to one of the chambers 4 and 5 and at the same time draining the fluid from the other chamber. In the present example we have shown two positive displacement pumps 10 and 11 connected in series by a conduit 12. The inlet of the pump 10 is connected to receive operating fluid from the source 9 and the outlet of the pump 11 is connected by a conduit 3 to a 3-way valve 14. The latter has three ports, a first port connected to the conduit 13, a second port connected to one end of a conduit 15 having another end connected to the pressure chamber 4, and a third port connected to one end of a conduit 16 having another end connected to the pressure chamber 5. The arrangement includes a second 3-way valve 17 which has a first port connected by a conduit 18 to the conduit 12, a second port connected by a conduit 19 to the conduit 16, and a third port connected by a conduit 20 to the conduit 15.

Both pumps 10 and 11 are driven from the engine for operating the propeller 7. The pump 10 may also serve to supply lubricant or operating fluid to bearings and other elements, not shown. The two 3-way valves 14 and 17 in the present example are connected to and controlled by a speed responsive device shown as a centrifugal type speed governor 21 driven from the engine. In the drawing the valves are shown in a neutral position. A change in speed causes turning of both 3-way valves 14 and 17 by action of the speed governor 21. If these valves are turned clockwise, the valve 14 establishes connection between the conduits 13 and 16, whereas the valve 17 establishes connection between the conduits 18 and 20. In this position of the valves fluid under pressure is forced through the conduit 13, the valve 14, and the conduit 16 into the chamber 5 and at the same time operating fluid is drained from the chamber 4 through the conduits 15, 20, the valve 17, the conduit 18 to the conduit 12, that is, the inlet of the pump 11. This causes movement of the piston 3 towards the left, thus changing the propeller pitch. Upon counterclockwise movement of the valves 14, 17 due to a change in speed, the valve 14 connects conduit 13 with conduit 15 and the valve 17 connects conduit 18 with conduit 19. Fluid thus is forced by the pump 11 through the conduit 13, the valve 14, and the conduit 15 into the chamber 4. Simultaneously fluid is drained from the chamber 5 through the conduit 16, the conduit 19, the valve 17, and the conduit 18 to the inlet conduit 12 of the pump 11. This causes movement of the piston 3 towards the right, thus reducing the propeller pitch. As the piston 3 reaches its end position in which it engages the stop 8, the propeller is feathered, that is, the blades are in neutral position. Broadly the pump 11 effects displacement of fluid between the chambers 4 and 5, receiving fluid from one chamber and forcing the fluid into the other chamber.

The arrangement includes feathering means to effect rapid feathering of the propeller whenever desired. This means includes a third positive displacement pump 22 having an inlet conduit 23 connected to the conduit 13, that is, to the discharge of the pump 11 and an outlet conduit 24 connected to the aforementioned conduit 15. The feathering pump 22 is driven by an electric motor 25 connected to an electric circuit which includes a source of electric energy indicated as a battery 26, a push button 27, and a differential pressure responsive cutout switch 28. The switch 28 is connected by a pipe 15a to the conduit 15 and by a pipe 16a to the conduit 16 and, as will be more fully explained hereinafter, the switch is responsive to the difference between the fluid pressures in said pipes 15 and 16. As this pressure difference increases and reaches a predetermined value the switch automatically opens the circuit for the motor 25.

During operation, closing of the push button 27 starts the motor 25, driving the feathering pump 22. Fluid is then forced through the pumps 10, 11 and the feathering pump 24 into the conduit 15 to the chamber 4. Simultaneously fluid is drained from the chamber 5 through the conduit 16, the valve 14, the conduit 13, to the conduit 23 and the inlet of the feathering pump, the 3-way valve 14 being in position to connect the conduits 13 and 16. Thus, the feathering pump 22 causes displacement of fluid between the chambers 4 and 5, fluid being drained from the chamber 5 and forced through the feathering pump 22 into the chamber 4. The conduit 15 includes a non-return valve 29 to prevent return flow of fluid discharged from the feathering pump 22. In case the valves 14 and 17 should for some reason not be in the proper position during feathering operation, the displacement of fluid between the chambers 4 and 5 is effected primarily through a bypass formed by a bore 29a through the piston 3. During operation, increase in fluid pressure in the chamber 4 forces the piston towards the right with the fluid contained in the chamber 5 displaced and forced into the chamber 4 through the bore 29a in the piston 5. As the piston reaches its right-hand end position, engaging the stop 8, the pressure in the chamber 4 is built up further and as it reaches a certain value relative to the pressure in the other chamber 5 the switch 28 is actuated to disconnect the motor 25 from the source of electric energy 26.

The differential pressure responsive cutout switch 28, as shown in Figs. 2, 3, and 4, comprises a housing or receptacle 30 which forms a chamber 31 closed at its upper end by a plug 32 screwed into the housing and sealed thereto by a gasket 33. The left-hand end of the housing forms a threaded, tubular extension 34 accommodating two terminals 35 and 36 supported on and electrically insulated from the housing by insulating material 37. The inner ends of the terminals are screwed into supports 38 and 39 for contacts 40 and 41 respectively. The contacts 40, 41 which preferably are made from silver are integrally united with the metallic supports 38, 39. The contact supports 38, 39 are insulated from the bottom of the housing by a plate 42 of insulating material and from the side wall of the housing by a sheet 43 of electrical insulating material. The contacts 40, 41 and the terminals 35, 36 secured thereto are connected to the push button 24 and the motor 22, as shown in Fig. 1. The bottom of the housing 30 is formed with two bores, a centrally located large bore 44 connected to the pipe 15a (Fig. 1) and another small bore 45 near the side wall of the housing connected to the pipe 16a. Both bores 44 and 45 extend through the bottom to the chamber 31. A piston or plunger 46 is slidably located in the large bore 44. An intermediate portion 47 of the plunger 46 has a larger diameter than the lower portion, thus forming a shoulder 48 and preventing the plunger 46 from dropping out of the chamber 31. The upper portion of the plunger 46 is provided with an extension 49 of electrical insulating material. This extension forms a spherically-shaped head engaging a contact-making and breaking disk or like member 50. The disk 50 in the present example is bimetallic, the upper portion consisting of copper and the lower portion or coating consisting of silver to assure a good electrical connection between the contacts 40, 41.

The central portion 51 of the disk 50 forms a depression. The lower or concave-shaped surface of the central portion 51 engages rockingly the spherical end portion or head 49 of the plunger 46 and the upper or convex-shaped surface of the central portion 51 engages rockingly a spring plate 52 which latter has a central, substantially spherically-shaped relatively small depression 53 in contact with the central portion 51 of the contact-making member 50. The spring plate 52 is biased downward by a compression spring 54 having a lower end located in a recess 55 of the spring plate. The spring 54 is located in an annular recess 56 formed in the plug 32. The compression of the spring 54 may be varied by the insertion or the removal of shims 57 in the upper end of the annular recess 56.

During assembly the insulating elements 37, 42 and 43 are inserted and secured to the housing whereupon the contact supports 38, 39 with the contacts 40, 41 are placed into the chamber 31 and secured to the terminals 35, 36. The plunger 46 with the insulating head 49 is inserted through the chamber into the bore 44. Thereafter the contact-making and breaking disk 50 is placed on top of the insulating head 49 and the gasket 33 is placed on the upper end face of the housing. Finally, the plug 32 is assembled with the spring 54 and the spring plate 52 and screwed into the upper end of the housing.

The cutout switch is simple in design and may be manufactured at comparatively low cost. The contact-making and breaking member, due to its spherical engagement with the head 49 and the depression in the spring plate 52, is self-aligning, that is, once the contact-making member is forced down into engagement with the contacts 40, 41, it will align itself automatically with the contact surface of the contacts 40, 41 and it will remain in this aligned position during subsequent movement of the plunger 46. The lower end of the central bore 44 according to our invention is connected to the high pressure pipe 15a, whereas the small bore 45 at its lower end communicates with an annular groove 58 formed in the lower surface of the housing 30 and connected to the low pressure pipe 16a.

After the switch is installed and put into operation, the chamber 31 is initially filled with operating fluid such as oil from the low pressure line 16a. Due to the fact that the central bore 44 is connected to the high pressure line and some leakage takes place along the clearance between the bore 44 and the plunger 46 into the chamber 31, a continuous slight leakage circulation from the bore 44 through the chamber 31 and out of the bore 45 into the pipe 16a takes place during operation. This is important because the small clearance between the plunger 46 and the bore 44 prevents solid impurities, that is, large particles that may be contained in the operating fluid from entering the pressure chamber 31. Thus, the arrangement reduces to a great extent formation of deposits and the accumulation of solids in the pressure chamber 31.

As stated before, the switch is normally held in closed position, as shown in Figs. 1 and 2. During operation, as the pressure in the conduit 24, the pipe 15a, and the bore 44 builds up and a predetermined pressure difference between the pipes 15a and 16a is reached, the plunger 46 is forced upward and thereby removes the contact-making member 50 from the contacts 40, 41, thus interrupting the electric circuit of the motor 25.

Having described the method of operation of our invention, together wtih the apparatus which we now consider to represent the best embodiment thereof, we desire to have it understood that the apparatus shown is only illustrative and that the invention may be carried out by other means.

What we claim as new and desire to secure by Letters Patent of the United States, is:

1. Pressure responsive device comprising a housing having a bore for connection to a source of fluid under pressure, a plunger slidably projecting into the bore and having an upper spherical end portion, a member with a central spherical depression loosely and rockingly engaging the spherical end portion, means biasing the member towards the end portion comprising a spring and a spring plate engaging the spring and having a central depression in engagement with the central portion of the member, and means controlled in response to movement of said member.

2. A differential pressure responsive device comprising a housing forming a chamber and two bores connected to the chamber, a plunger slidably disposed in one of the bores and having a spherical end portion located in the chamber, an actuating member having a central portion with a depression rockingly engaging the spherical end portion of the plunger, means biasing the member towards the plunger comprising a compression spring and a spring plate having a central recess rockingly engaging the central portion of said member, and means controlled in response to movement of the member.

3. Pressure responsive switch comprising a housing forming a chamber and a bore, a plunger slidably projecting into the bore and having a spherical end portion of electrical insulating material located in the chamber, a metallic disk having a central portion with a depression loosely and rockingly engaging said spherical end portion, means loosely engaging and biasing the disk towards the spherical end portion, and contact means supported on the housing in cooperative relation with the disk.

4. Pressure responsive switch comprising a housing forming a chamber and a bore for connection to a source of fluid under pressure, a plunger movably disposed in the bore and having a spherical end portion of electrical insulating material disposed within the chamber, a contact-making disk having a central depression loosely and rockingly engaging the spherical end portion, means including a spring and a spring plate made from insulating material for biasing the contact disk towards the spherical end portion, and means including contacts located in the chamber and insulated from the housing in cooperative relation with the contact-making disk.

5. Differential pressure responsive switch comprising a housing forming a pressure chamber, a high pressure bore and a low pressure bore communicating with the chamber, a plunger slidably projecting into the high pressure bore and having a spherical end portion located in the chamber, a contact-making disk having a central depression rockingly engaging the spherical end portion, electric contacts located in the chamber and electrically insulated from the housing, and spring means for biasing the contact disk towards the spherical head into engagement with the contacts.

6. Differential pressure responsive switch comprising a housing forming a pressure chamber, a bore for connection to a source of high pressure and a bore for connection with a source of low pressure and communicating with the chamber, a plunger slidably projecting into the high pressure bore and having a spherical end portion made of electrical insulating material located in the chamber, a disk having a central portion with a lower surface concave-shaped and in rocking engagement with said end portion, the central portion of the disk having an upper surface convex-shaped, means biasing the disk towards the plunger comprising a spring and a spring plate having a central portion with a depression rockingly engaging said convex-shaped upper surface of the disk, contacts fastened within and electrically insulated from the housing in cooperative relation with the disk, and terminals projecting through the housing and secured to the contacts.

PAUL J. SCHWARZHAUPT.
KENNETH A. KILLAM.
LAURENS A. TAYLOR.